(12) United States Patent
Arnold

(10) Patent No.: US 6,539,674 B2
(45) Date of Patent: Apr. 1, 2003

(54) WORK BENCH-TORNADO SAFE ROOM

(76) Inventor: Floyd Arnold, 5226 Christiancy Ave., Port Orange, FL (US) 32327

( * ) Notice: Subject to any disclaimer, the term of this patent is extended or adjusted under 35 U.S.C. 154(b) by 0 days.

(21) Appl. No.: 09/879,513

(22) Filed: Jun. 12, 2001

(65) Prior Publication Data

US 2001/0039770 A1 Nov. 15, 2001

Related U.S. Application Data

(63) Continuation-in-part of application No. 09/561,436, filed on Apr. 28, 2000, now Pat. No. 6,334,278, which is a continuation-in-part of application No. 09/395,334, filed on Sep. 13, 1999, now abandoned.

(51) Int. Cl.$^7$ ................................................. E04H 9/00
(52) U.S. Cl. ........................ 52/79.1; 52/79.5; 52/143; 52/169.9; 70/101; 70/104; 70/128; 70/181; 49/160; 49/180; 49/356; 49/394; 109/15
(58) Field of Search ............................... 52/79.1, 79.5, 52/143, 169.6; 70/101, 104, 128, 181; 49/160, 180, 356, 394; 109/15, 59 R

(56) References Cited

U.S. PATENT DOCUMENTS

| | | | | |
|---|---|---|---|---|
| 3,744,195 A | | 7/1973 | Ferkich | 52/63 |
| 4,126,972 A | | 11/1978 | Silen | 52/34 |
| 4,331,252 A | | 5/1982 | Carren et al. | 220/5 |
| 4,438,606 A | | 3/1984 | Chardon et al. | 52/79.1 |
| 4,787,181 A | | 11/1988 | Witten et al. | 52/79.1 |
| 5,376,315 A | * | 12/1994 | Fricke | 264/31 |
| 5,481,837 A | * | 1/1996 | Minks, Jr. | 52/169.6 |
| 5,813,174 A | * | 9/1998 | Waller | 52/79.1 |
| 5,848,500 A | | 12/1998 | Kirk | 52/79.1 |
| 5,953,866 A | | 9/1999 | Poole | 52/169.6 |
| 5,979,128 A | | 11/1999 | Parsons | 52/169.6 |
| 6,003,271 A | | 12/1999 | Boyer et al. | 52/79.5 |
| 6,131,343 A | * | 10/2000 | Jackson, Jr. | 52/86 |
| 6,151,841 A | * | 11/2000 | Green | 52/79.4 |
| 6,161,345 A | | 12/2000 | Hope et al. | 52/169.6 |
| 6,308,466 B1 | * | 10/2001 | Moriarty | 52/79.5 |
| 6,343,443 B1 | * | 2/2002 | Tylicki, Jr. | 52/79.1 |

* cited by examiner

*Primary Examiner*—Carl D. Friedman
*Assistant Examiner*—Christy M. Green
(74) *Attorney, Agent, or Firm*—Brian S. Steinberger; Law Offices of Brian S. Steinberger PA

(57) ABSTRACT

A tabletop high relocateable shelter for protecting individuals from dangerous conditions such as hurricanes, tornadoes and the like, that can withstand winds of approximately 450 mph. The shelter can be attached and detached from a concrete foundation. A rectangular frame that is formed from L-shaped longitudinal members are fastened together and can be anchored to the concrete foundation by hook ended anchor bolts that have exposed threaded ends that nuts can attach thereto, or by concrete type bolts made for that purpose. Removable panels can be attached to the outside of the frame to form walls and a roof using fasteners such as screws and bolts. A door can be attached to an opening in the side of the frame, and include L-shaped members that form door braces and hinge guards that allow the door to stay in a stationary closed position. Slideable latching members can further hold the door in a locked position. The latching members can be accessible from outside the shelter to open the door and also be accessible from inside the shelter to open the door. The latching members can include outside handle ends, longitudinal bar portions and tip ends that slide in and out of mateable openings in the side edge of the free-end of the door. The entire structure can be easily assembled and disassembled with ease. The shelter can be formed from strong suitable materials such as 1/4 inch carbon steel plates. The shelter is sized large enough to allow plural persons to sit or crouch inside. The novel shelter size can be used inside a garage, carport, and the like, where there is still ample place between vehicles stored in the garage and the shelter. The shelter roof is useable as a tabletop work surface such as for use as a workbench.

16 Claims, 8 Drawing Sheets

WORK BENCH-TORNADO SAFE ROOM

This invention relates to shelters and in particular to a temporary storm protection shelter resembling a workbench that can be site assembled in tight spaces such as a garage and when not used as a shelter has another utility such as being used for a workbench, and this invention is a Continuation-In-Part of U.S. patent application Ser. No. 09/561,436 filed Apr. 28, 2000 now U.S. Pat. No. 6,334,278, which is a Continuation-In-Part Of U.S. patent application Ser. No. 09/395,334 filed Sep. 13, 1999, now abandoned.

BACKGROUND AND PRIOR ART

Storms such as hurricanes and tornadoes can occur with little warning and can be very dangerous. For dangerous fast approaching storms such as hurricanes and tornadoes, safe emergency shelters are needed to protect persons and property from the immediate harm and destruction. Tornadoes are normally seasonal with the months of March through June being the most active. Approximately twenty percent of all tornadoes occur during the months of July through October, and less than ten percent occur during November through January. Tornadoes have been recorded with wind speeds of over 300 mph and can stay on the ground for over one hour. Flying debris can cause much injury and destruction. In recent years, more than 1,000 twisters have killed in excess of one hundred twenty people and caused millions of dollars in property damage in the United States. The dollar figure for the damage caused by tornadoes which have struck Oklahoma City, Okla. in May, 1999 alone has exceeded more than 90 million dollars.

Hurricanes such as Hurricane Andrew have been known to cause catastrophic damages in the billions of dollars. Regardless of catastrophic damages that occur from tornadoes, hurricanes, and other hazards, relatively little protection against them is provided because of variously prohibitive problems with present protection alternatives. Thus, there exists a need for emergency shelters.

As is well known between the times a tornado is spotted or warnings are given, there is usually very little time for individuals and families to seek shelter. Since community shelters are not close by to everyone needing the shelter and these types of shelters often do not allow for pets, there is a need for individualized shelters in close proximity to an individual's home.

The National Tornado Forum has announced an effort to encourage more people to build "safe rooms" (emergency shelters). The Federal Emergency Management Agency (FEMA) and the Federal National Mortgage Association (Fannie Mae) have programs and financing in place the encourage people to put their families in "safe rooms" (shelters). The average family moves approximately every seven years. Thus, reusable and individualized shelters would be desirable.

A variety of emergency shelters previously have been pre-manufactured for field uses constructed of cement, steel, fiberglass and other materials. Others have been manufactured in an assembled condition for particular applications. None of these prior art shelters can be site-assembled from matching parts and possess the ability of being moveable or relocateable to another address, should the owner decide to relocate, as this invention.

U.S. Pat. No. 6,003,271 to Boyer et al. describes a pre-case security vault device that includes components that can be transported to a construction site. However, this device includes the assembly of permanently affixing the components together such as by using permanent fasteners such as "welds", and the pouring of "concrete" for floors, and the like, and nonremovable fill such as "grout" at the site, column 1, lines 37–38, column 2, lines 66+, column 3, lines 1–10, 12–25, 60–65, column 4, lines 2–4, 37–43. No where does Boyer et al. describe, nor suggest being able to easily disassemble the vault to be able to be relocated at subsequent sites. Additionally, neither description, nor suggestion is given in the Boyer "vault" for ventilation purposes to allow humans to be sheltered therein. While Boyer mentions that it may be desirable in the background section of the patent to "protect property from damage or theft or to serve as a shelter . . . ", column 1, lines 4–7, the Boyer "vault" device requires that there construction forms a "vapor-tight enclosure . . . and . . . preventing water from seeping into the vault to damage the property in the vault", column 3, lines 14–18. Thus, Boyer is primarily used for protecting property and not as a "shelter" for people. Additionally, Boyer is too large to be used in limited spaces such as garages since it would take up to much space. Furthermore, Boyer has almost no other utility when not being used as a shelter.

Various other types of shelters have also been proposed over time. See for example, U.S. Pat. No. 4,126,972 to Silen; U.S. Pat. No. 4,331,262 to Carren et al.; U.S. Pat. No. 4,438,606 to Chardon et al.; U.S. Pat. No. 5,953,866 to Poole; U.S. Pat. No. 5,979,128 to Parsons; U.S. Pat. No. 6,131,343 to Jackson; and U.S. Pat. No. 6,161,345 to Hope et al. However, each of these proposed devices has problems that would prohibit their wide use. For example, Carren '606 is primarily used for storing liquids, and not as a protective shelter for people. Chardon '606 is designed for "protecting large-size objects, such as open-air machines, cycles, motorcycles, windsurfers, etc.", abstract, and is also not designed for protecting people. Poole '866, Parsons '128 and Hope et al. '345 are shelters that require some portion to be inserted into the ground making the shelter permanent and not easily disassembled. In addition the subsurface installation is not practical and in fact dangerous to be used in many low level water regions such as Florida, since storms can potentially flood these below ground shelters. Further, these patents require users access the shelters through a roof door, which causes inherent problems if debris falls on the top of the shelter and restricting the door from being opened. While Jackson '343 and Silen '972 propose above ground shelters, these devices have another problem which is similar to the other patents referenced above in that none of them would be practical in limited spaces such as garages since the shelters would take up to much space and eliminate space of automobiles, and the like. In addition, most of these patented shelters can not be used for other applications when not being used as a shelter. For example, the height of many of these shelters would eliminate their use as a tabletop, and/or for storing easily retrievable items on the top.

SUMMARY OF THE INVENTION

The first objective of the present invention is to provide an easily assembled and relocateable shelter for protecting persons from dangerous conditions such as storms that can be produced at a minimal cost to merit its need.

The second objective of the present invention is to provide an easily assembled and relocateable shelter for protecting persons from dangerous conditions such as storms that can be made from a variety of materials such as carbon steel, stainless steel, aluminum, and the like.

The third objective of the present invention is to provide an easily assembled and relocateable shelter for protecting persons from dangerous conditions such as storms that can be structured for protection against a wide selection of hazards;

The fourth objective of the present invention is to provide an easily assembled and relocateable shelter for protecting persons from dangerous conditions such as storms that can be marketed either assembled or unassembled.

The fifth objective of the present invention is to provide an easily assembled and relocateable shelter for protecting persons from dangerous conditions such as storms that can be packaged for low-bulk, inexpensive and convenient transport.

The sixth objective of the present invention is to provide an easily assembled and relocateable shelter for protecting persons from dangerous conditions such as storms that can be assembled by inexperienced persons.

The seventh objective of the present invention is to provide an easily assembled and relocateable shelter for protecting persons from dangerous conditions such as storms that can be made in sizes to meet different use requirements.

The eighth objective of the present invention is to provide an easily assembled and relocateable shelter for protecting persons from dangerous conditions such as storms that can be used for storage of food and water to meet disaster needs.

The ninth objective of the present invention is to provide an easily assembled and relocateable shelter for protecting persons from dangerous conditions such as storms that can be disassembled and transported to new location should the owner move.

The tenth objective of the present invention is to provide an easily assembled and relocateable shelter for protecting persons from dangerous conditions such as storms that can be tested and certified to withstand hazards.

The eleventh objective of the present invention is to provide an easily assembled and relocateable shelter for protecting persons from dangerous conditions such as storms that can be used as an annex to a building.

The twelfth objective of the present invention is to provide an easily assembled and relocateable shelter for protecting persons from dangerous conditions such as storms that can be positioned inside of a garage/carport and have plenty of room between the shelter and any vehicle(s) normally stored inside the garage/carport.

The thirteenth objective of the present invention is to provide an easily assembled and relocateable shelter for protecting persons from dangerous storms, where the shelter can be used as a workbench type table when not being used as a shelter.

The fourteenth objective of the present invention is to provide an easily assembled and relocateable shelter for protecting persons from dangerous storms, having a side access door that can be opened from inside or outside the shelter.

The fifteenth objective of the present invention is to provide an easily assembled and relocateable shelter for protecting persons from dangerous storms, for above ground use, that can easily be attachable and removable to concrete floors.

The sixteenth objective of the present invention is to provide an easily assembled and relocateable shelter for protecting persons from dangerous storms which is sized to allow users to sit within the shelter.

The seventeenth objective of the present invention is to provide an easily assembled and relocateable shelter for protecting persons from dangerous storms that is both less obtrusive and takes up less space than traditional storm shelters.

A preferred embodiment of the relocateable shelter includes a rectangular frame formed from panels and members that can be fastened and unfastened together, to form walls and a roof to the frame, and a door that can be attached to one of the walls of the frame for allowing access to an interior of the frame, wherein the frame, panels and door form a shelter allowing persons to seek safety within the shelter. The shelter can be attached to a rectangular concrete foundation beneath the shelter. The shelter can be sized to sizes similar to that of a workbench type table, and be formed from suitable strong materials such as ¼ inch carbon steel plates. The door can be attached to the shelter by a hinge having a step shaped hinge guard for bracing the door to a closed position adjacent to the hinge. Slideable latches can be used to lock the door, where the latches can be accessible to both outside and inside of the shelter to open the door from a closed position. The latches can each include an elongated bar that having one end that slides inside of the shelter to lock the door, and have an outer end having a handle for allowing the door to be opened from outside of the shelter.

This invention makes it possible for a person, family or other group to have a place of security readily available on the interior of structures with concrete floors such as garages and carports or just outside the door of manufacture homes and mobile homes.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject invention is a Continuation-In-Part of U.S. patent application Ser. No. 09/561,436 filed Apr. 28, 2000, which is a Continuation-In-Part Of U.S. patent application Ser. No. 09/395,334 filed Sep. 13, 1999, now abandoned, both of which are incorporated by reference.

The subject shelter invention is similar in construction and components to the parent invention shelters which have been tested and certified to withstand 450 miles per hour winds, by Certified Testing Laboratory, 7252 Narcoossee Road, Orlando, Fla., 32822, an independent, Miami, Dade County approved testing laboratory. Thus, the subject invention should at least meet the same testing and criteria as the parent invention shelters and be useful for dangerous storms such as but not limited to hurricanes and tornadoes.

Figure 1:
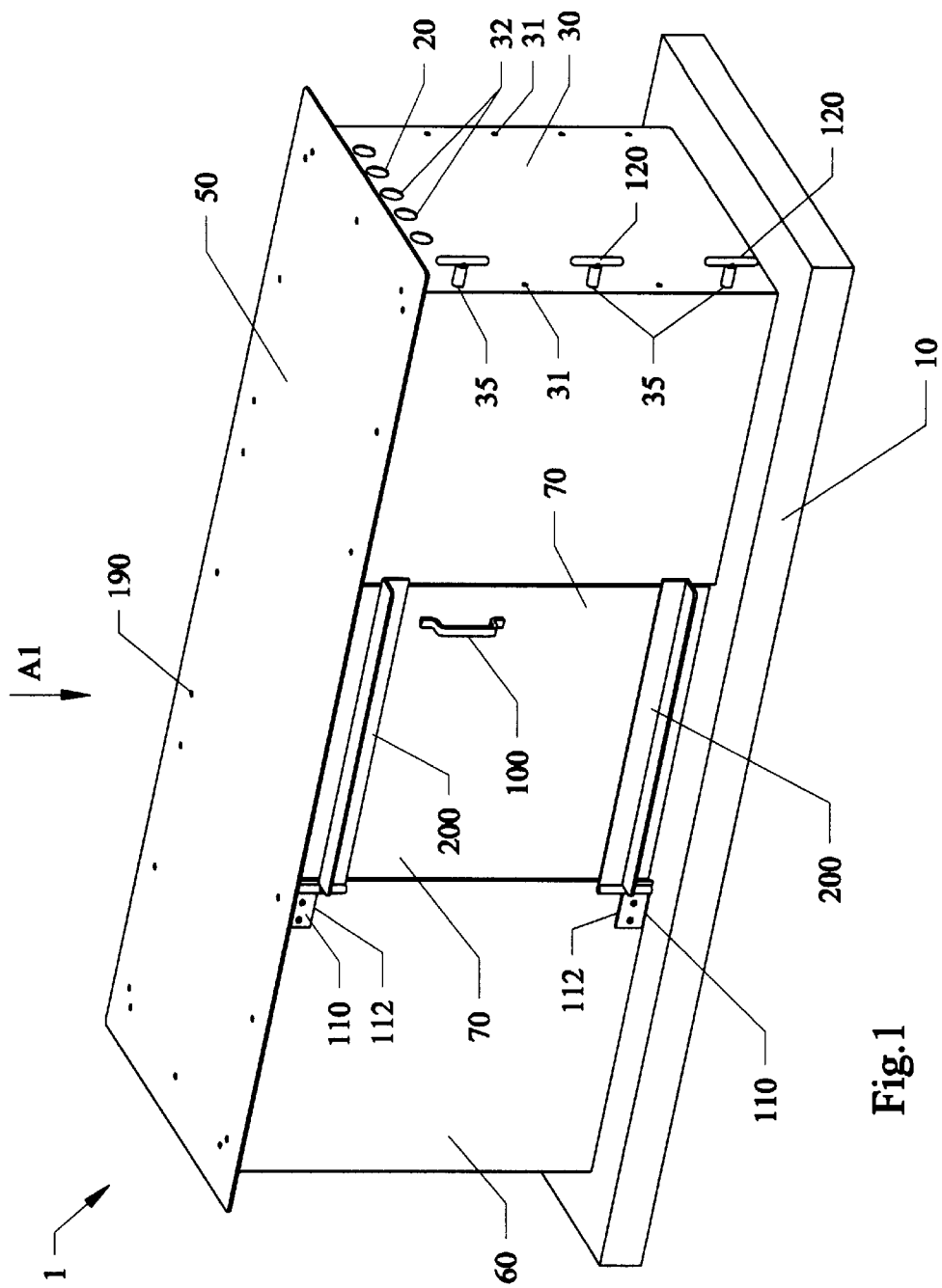
FIG. 1 is a perspective view of a preferred embodiment of the shelter with the side door in a closed position.
Figure 2:
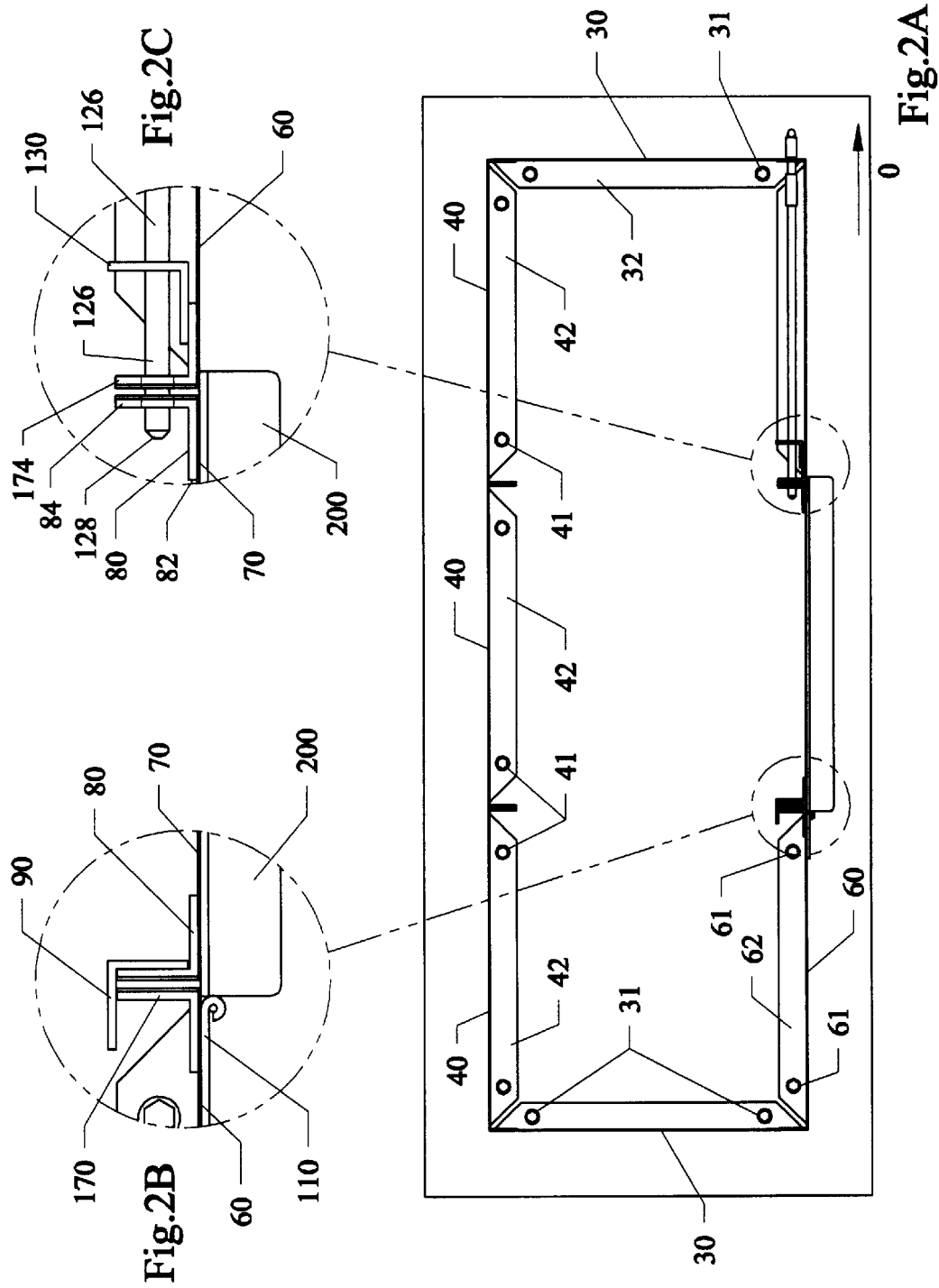
FIG. 2A is a top view of the shelter of FIG. 1 along arrow A1 with the top removed.
FIG. 2B is an enlarged view of the door hinge and jam of FIG. 2A.
FIG. 2C is an enlarged view of the safe-T handle of FIG. 2A.

FIG. 1 is a perspective view of a preferred embodiment 1 of the shelter with the side door 70 in a closed position. FIG. 2A is a top view of the shelter 1 of FIG. 1 along arrow A1 with the top 50 removed. FIG. 2B is an enlarged view of the door hinge and jam assembly 85 of FIG. 2A. FIG. 2C is an enlarged view of the safe-T handle assembly 125 of FIG. 2A.

Figure 3:
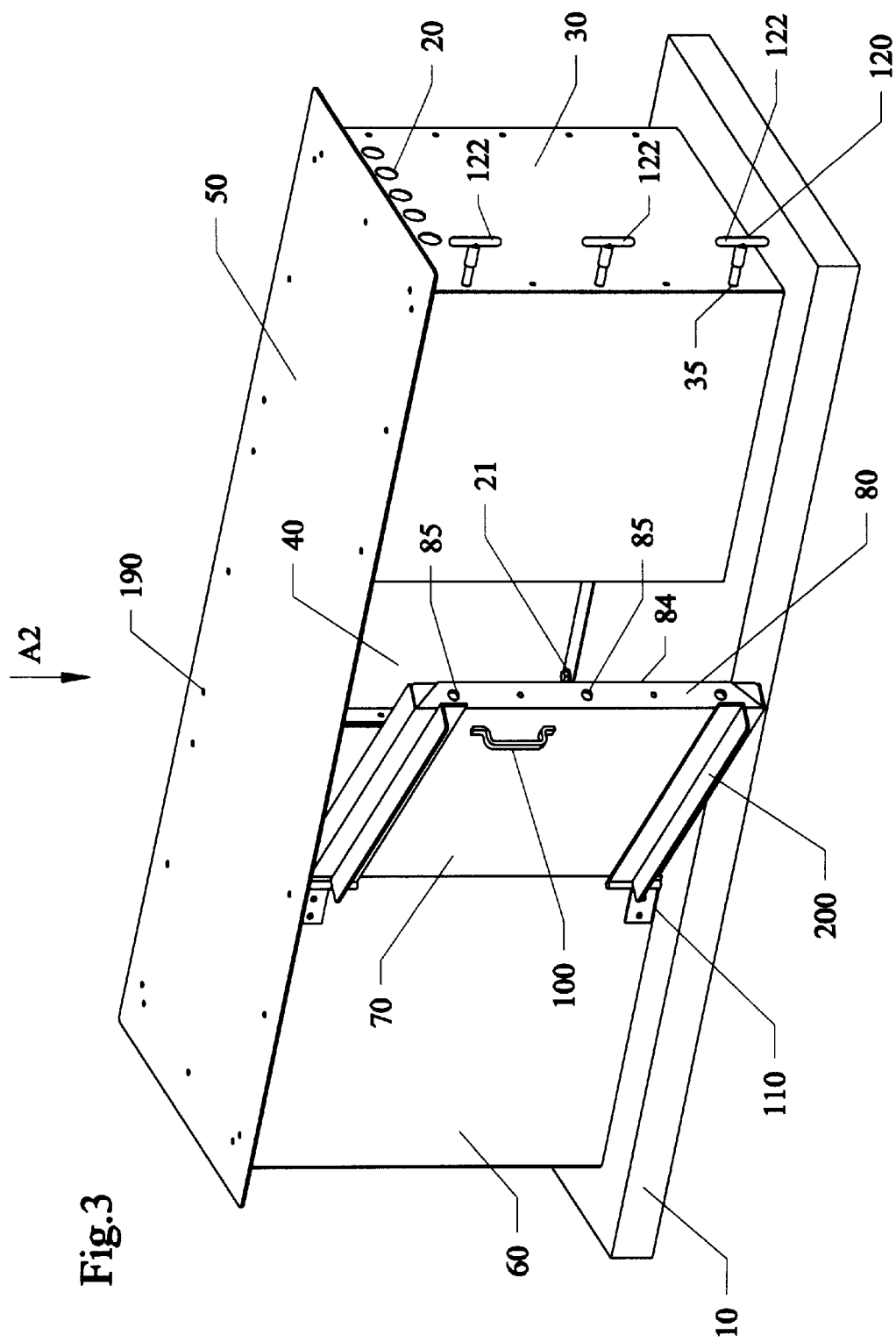
FIG. 3 is another view of the shelter of FIG. 1 with the door in a slightly open position.
Figure 4:
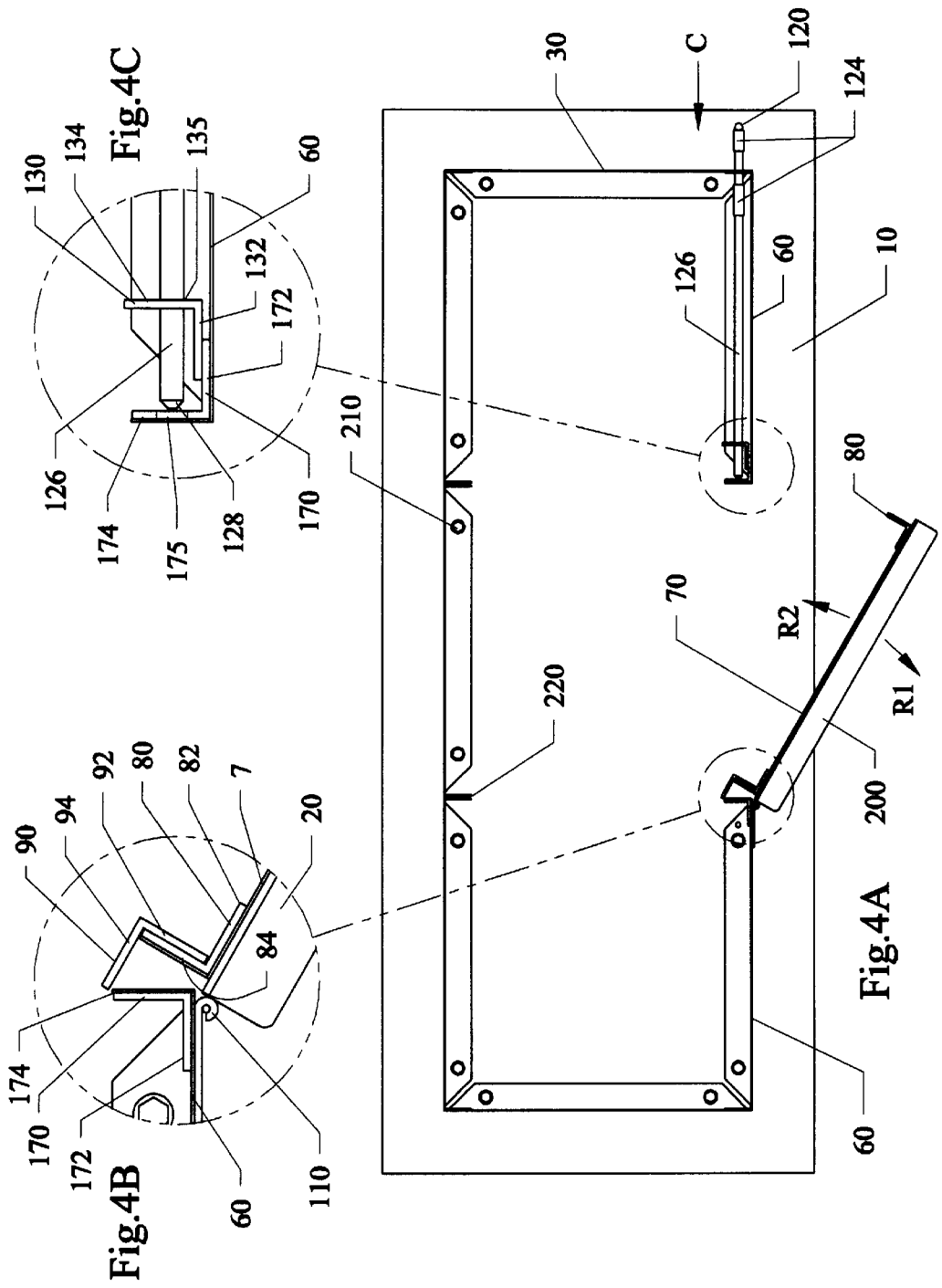
FIG. 4A is a top view of the shelter of FIG. 3 along arrow A2 with the top removed.
FIG. 4B is an enlarged view of the door hinge and jam of FIG. 4A.
FIG. 4C is an enlarged view of the safe-T handle of FIG. 4A.

FIG. 3 is another view of the shelter 1 of FIG. 1 with the door 70 in a slightly open position. FIG. 4A is a top view of the shelter 1 of FIG. 3 along arrow A2 with the top 50 removed.

Figure 5:
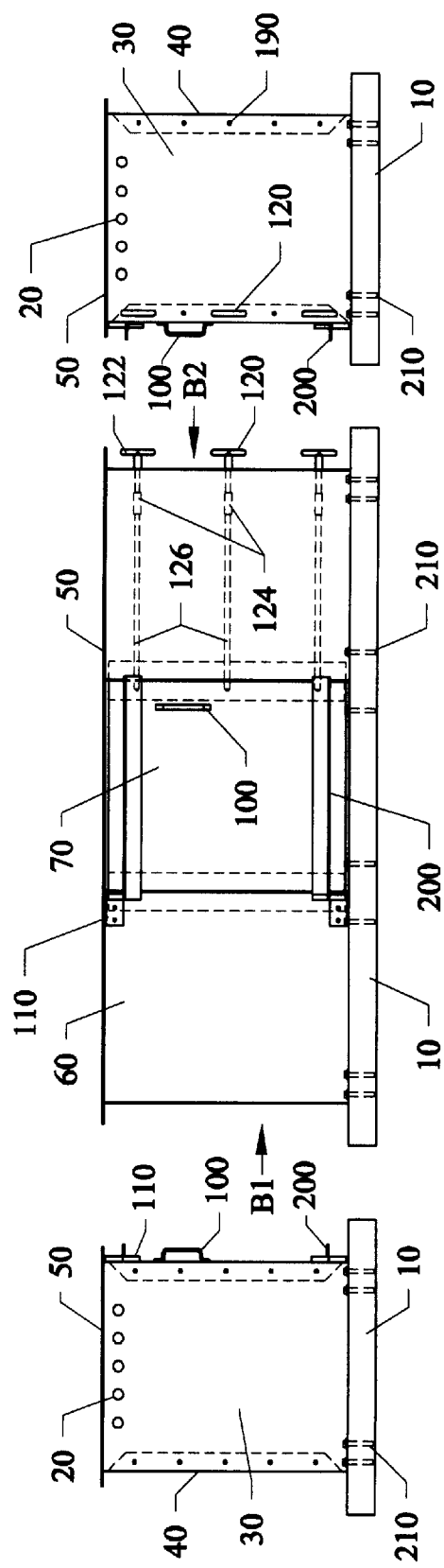
FIG. 5A is a front view of the shelter of FIG. 1.
FIG. 5B is a side end view of the shelter of FIG. 5A along arrow B1.
FIG. 5C is a side end view of the shelter of 5A along arrow B2.
Figure 6:
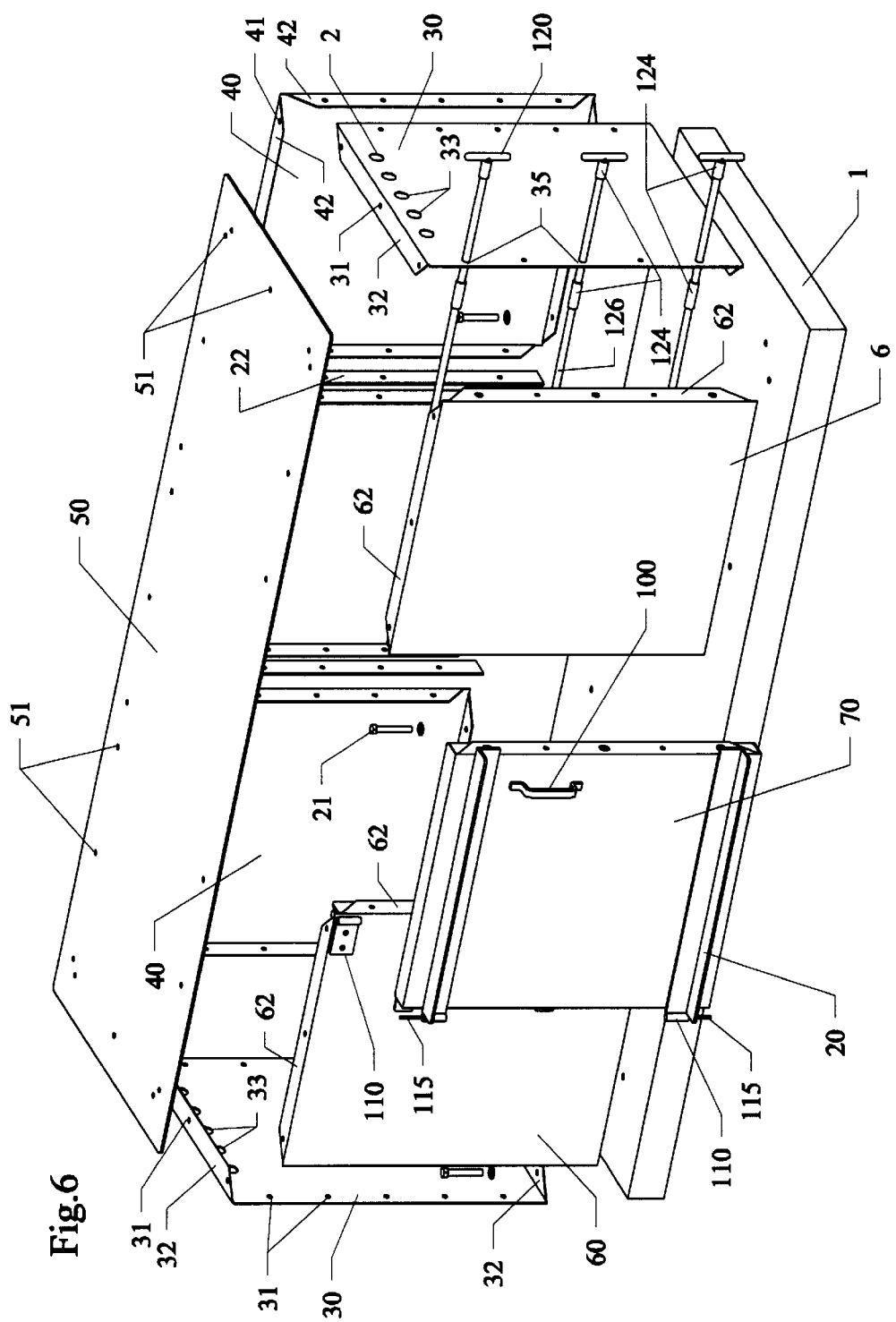
FIG. 6 is an exploded view of the shelter of FIG. 1.

FIG. 4B is an enlarged view of the door hinge and jam assembly of FIG. 4A. FIG. 4C is an enlarged view of the safe-T handle assembly of FIG. 4A. FIG. 5A is a front view of the shelter 1 of FIG. 1. FIG. 5B is a side end view of the shelter 1 of FIG. 5A along arrow B1. FIG. 5C is a side end view of the shelter 1 of 5A along arrow B2. FIG. 6 is an exploded view of the shelter 1 of FIG. 1.

Referring to FIGS. 1–6, shelter 1 can include a concrete foundation 10 that can be rectangular shaped with dimensions of approximately 50 inches to approximately 92 inches long by approximately 32 inches wide by approximately 4 or more inches thick. The shelter body can have overall dimensions of approximately thirty inches wide by approximately 30 to approximately 36 inches high, by approximately 48 inches to approximately 90 inches long, and be formed from materials such as approximately ¼ inch thick carbon steel plates, and other components to be described in reference to the drawings.

Referring to FIGS. 1–6, shelter 1 can be a rectangular frame with front side panels 60 on opposite sides of door 70 substantially centered therebetween. Three back panels 40 can be along the rear long side of the shelter 1. End panels 30 can be located on opposite ends of the front and back panels. Each of the end panels 30 can include additional holes 33 that can be used as ventilation openings to access the inside airspace of the shelter. Each of the front and back panels 40, 60 can include four inwardly bent edges 62, can include bent edges about each of their respective four sides. Each of the side panels 30 can include upper and lower bent edges 32 along the upper and bottom edges, respectively. The panels 30, 40, 60 can be attached to one another by abutting their side bent edges and respectively located through-holes 31, 41, 61 adjacent to one another using fasteners such as but not limited to bolts, screws, and the like, to form a rectangular shape. A roof panel 50 can be attached to the upper bent edges on all the panels 30, 40, 60 by using fasteners such as not but not limited to bolts, screws, and the like, that pass through through-holes 31, 41, 51 and 61. Similarly, the bottom bent edges 32, 42, 62 of the panels 30, 40, 60 can be attached to a foundation 10 such as concrete, and the like by using similar fasteners such as but not limited to bolts, screws, and the like, that pass through respective through-holes 31, 41, 61. Foundation 10 can be a raised concrete foundation or be part of an existing concrete floor such as one located in a garage, carport, and the like. Fasteners 190, can be bolts, screws, washers, and the like. Fasteners 210 can be bolts, and washers, and the like, such as but not limited to approximately four inch concrete bolts with washers, and the like. Additionally, panel spacers 220 can be used between each bent edge of the panels that abut against one another(see for example, FIG. 2A).

The assembly and operation of the door 70 will now be described in reference to FIGS. 1–6. Door 70 can be substantially centrally located along one long side of the rectangular shelter 1 between front panels 60. Door 70 can be attached to a left front panel 60 by two hinge 110. Each of the hinges 110 can have a stationary plate portion 112 that can be fastened by welds, and the like, to the front of left front panel 60. The second portion of the hinges 110 can include an L-shaped cross bar 200 that can be similarly fastened by welds, and the like, to the front of door 70. A cotter type pin 115 can connect both portions 112, and 200 of the hinges 110 together. Facing inwardly from left front panel 60 can be an L-shaped doorjam 170 having one leg 172 fastened to the inside edge of the panel 60 by welds, and the like. The second leg 174 is perpendicular to leg 172. Fastened to the back of food 70 can be an L-shaped door brace 80 having one leg 82 fastened along a left side rear edge of door 70 by welds, and the like. A second leg 84 perpendicular to the first leg 82 can be fastened to one leg 92 of an L-shaped door hinge guard 90. The second leg 94 of the door hinge guard 90 is perpendicular to leg 92, and substantially parallel to door 70. The door 70 can be opened outward by pulling on door handle 100. When door 70 is closed, legs 82, 92 of both door brace 80 and door hinge guard 90 abut against leg 174 of doorjam, while leg 94 of door hinge guard 90 abuts about the outer edge of leg 174 preventing the door 70 from opening into the interior space of the shelter 1.

The locking and accessing of the door 70 will now be described in reference to FIGS. 1–6. On right end panel 30, additional through-holes 35 exist mounting safe-T-handles and allow elongated bars 126 to pass therethrough with handles 122 exterior to the shelter 1. Enlarged stop collars 124 on the elongated bar 126 on both sides of panel 30 restrict the bars 126 from being fully pulled out of or fully pushed into the shelter 1. Opposite the handles 122 is a narrow tip end 128, the relevance of which will be described later. Although three safe-T-handles 120 are shown in parallel along the front edge of right side panel 30, the invention can be practiced with one, two or more than three safe-T-handles as needed. On the back of right front panel 60 is an L-shaped door jam angle bracket 170 having one leg 172 fastened by welds, and the like, to the back side of front right panel 60, with a second leg 174 perpendicular to the first leg 172 having through-holes 175 therethrough for allowing the narrow tip 128 of elongated bar 126 to pass therethrough. A safe-T-handle L-shaped support bracket 130 has one leg 132 fastened by welds, and the like to inner surface side of leg 172 of the bracket 170. Second leg 134 perpendicular to leg 132 has a through-hole 135 for supporting elongated bar 126 therein. An L-shaped door brace 80 has one leg 82 that is fastened to the rear right edge of door 70, by welds, and the like. The second leg 84 of brace 80 has through-holes 85 for also allowing narrow tip 128 of elongated bar 126 to pass therethrough.

Referring to FIGS. 2A–2C, 3 and 4A–4C, while the door 70 is open and has been rotated in the direction of arrow R1, the safe-T-Handles 120 are pulled to the right in the direction of arrow 0 until left stop collar 124 abuts against panel 30. To close and lock the shelter, the door 70 is closed in the direction of arrow R2 until door hinge guard abuts against door jam angle brace 170(as shown in FIG. 2B). Next, handles 122 are pushed in the direction of arrow C so that elongated bar passes through through-holes 35 of panel 30 and through-holes 135 of bracket 130, so that narrow tip 128 passes through through-holes 175 of bracket 170 and through-holes 85 of brace 80 locking the door 70 in a closed position. Occupants inside shelter 1, can also open the door by gripping elongated bars 126 and sliding them in the direction of arrow 0. Likewise, occupants of the shelter 1 can close the shelter door 70 and lock the bars 126 by similar procedures to that described above.

Figure 7:
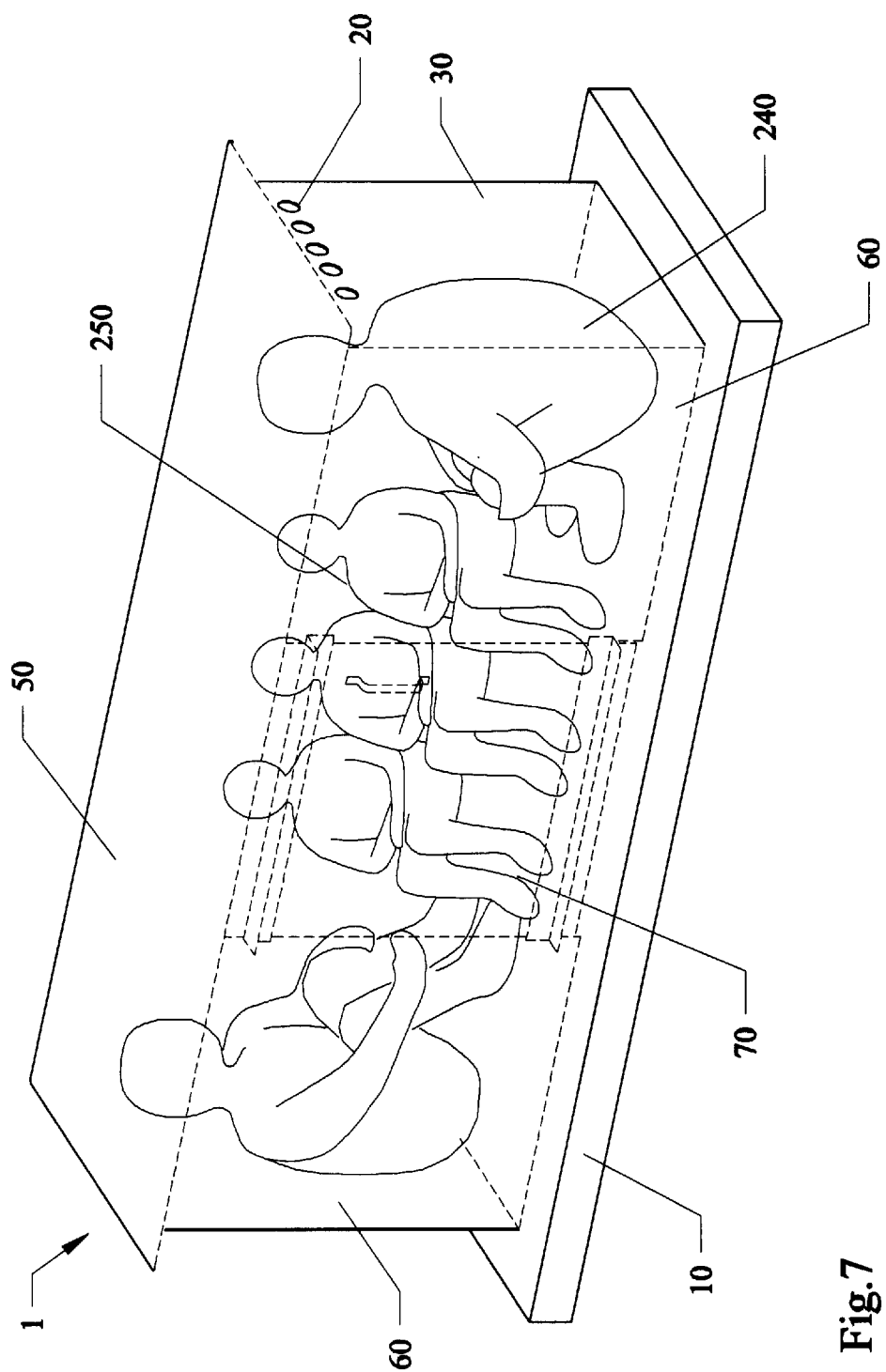
FIG. 7 is a view of the shelter of the preceding figures with occupants.

FIG. 7 is a view of the shelter 1 of the preceding figures showing up to five occupants that can include two adults 240, and three children 250, each in sitting positions within the shelter 1. When a storm approaches, the novel invention can be accessed easily by opening the shelter door 70, and having the occupants crawl inside for immediate safety.

Figure 8:
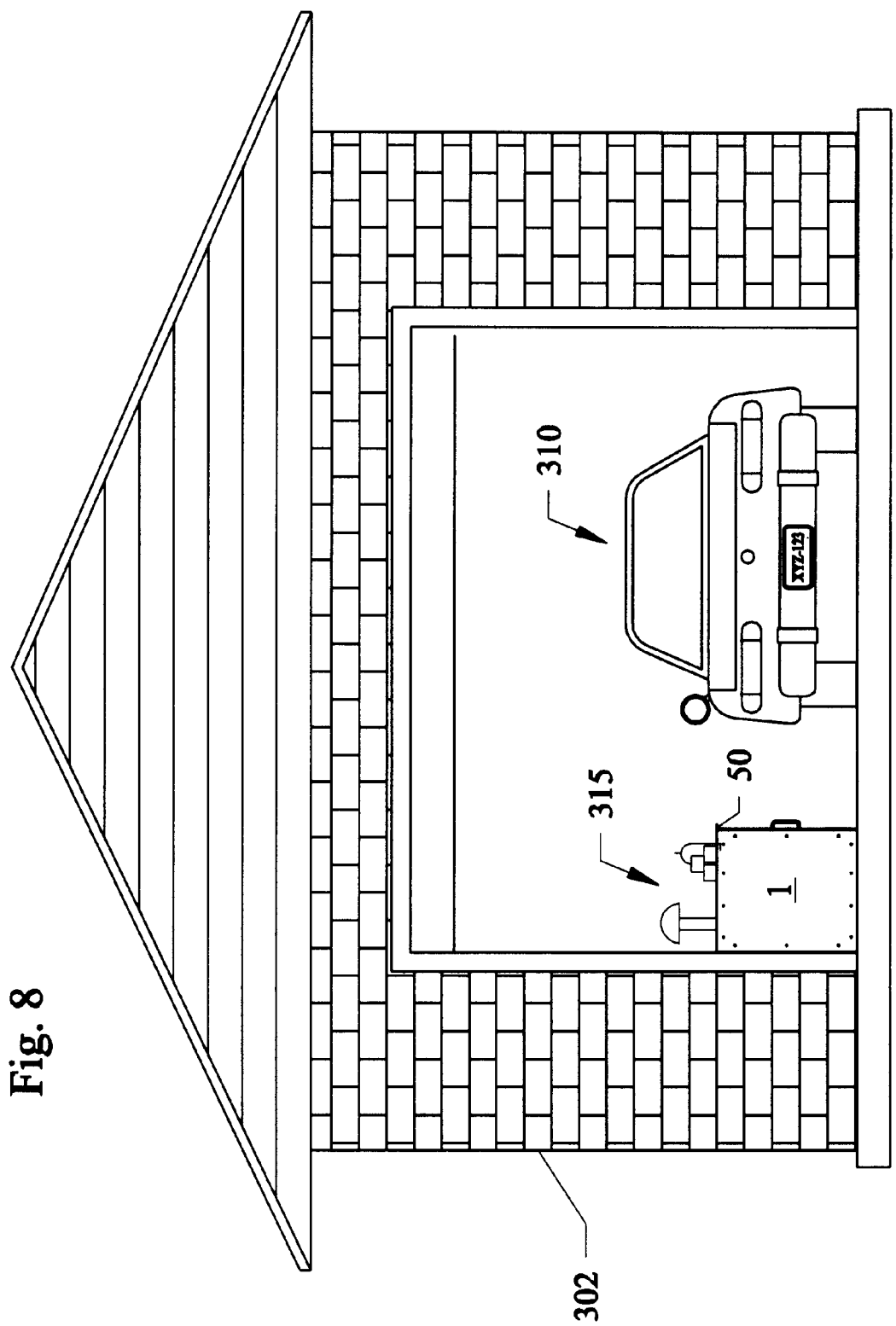
FIG. 8 is a front view of a garage using the novel shelter of the preceding figures.

FIG. 8 is a front view of a garage 302 using the novel shelter 1 of the preceding figures. In FIG. 8, a vehicle 310 such as an automobile, and the like, can be positioned within a garage with the shelter 1, where persons can access both the shelter 1 and the vehicle 310. Additionally, the roof 50 of the shelter 1 can be used as a work surface, such as but not limited to a workbench where items 315 such as a light, tools, and the like, can be stored on top. The shelter can also be used as a table for other applications besides a workbench. For example, the outside of the shelter can be painted or covered with material such as wood, and the like, so that the shelter can be used as a piece of furniture inside of the living quarters of a home, and the like.

While the preferred embodiment describes assembling and using the shelter, the novel shelter can be easily disassembled and relocateable to other sites.

Although the preferred embodiment describes the workbench shelter for use in a structure such as a garage and carport, the invention can be located in other structures, such as on a concrete basement floor, on tiled floors, in warehouses, commercial buildings, in high-rise buildings, and the like. Additionally, the shelter can be used with its own foundation for applications such as adjacent to a mobile home, trailer park, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A tabletop high above-ground shelter for protecting humans from storms, comprising in combination:
    wall panels forming a rectangular housing with a hollow space therebetween, the housing having a height for allowing human occupants be seated therein;
    a roof for covering for attaching to the rectangular housing and covering over the hollow space, the roof being used as a tabletop;
    a door for allowing access to an interior portion of the hollow space;
    plural horizontal latch means for locking and opening the door, the latch means being accessible to both outside and inside of the shelter to open the door from a closed position, the latch means includes a horizontally oriented elongated bar that having one end that slides inside of the shelter to lock the door, and having portions for allowing the door to be opened and closed; and
    a foundation for supporting the rectangular housing above ground level, wherein the rectangular housing forms a shelter allowing the occupants to seek safety within the shelter.

2. The tabletop high above-ground shelter of claim 1, further comprising:
    a vehicle storage structure for using the shelter therein, the shelter chosen from one of a garage and a carport, the shelter being used in the structure without taking existing space for storing a vehicle away from the vehicle storage structure.

3. The tabletop high above-ground shelter of claim 1, further comprising:
    a vehicle storage structure for positioning the shelter therein, wherein the shelter and a vehicle are able to be both simultaneously located within the structure so that both the shelter and the vehicle are both simultaneously accessible by humans.

4. The tabletop high above-ground shelter of claim 1, wherein the rectangular housing includes dimensions of approximately 30 inches wide by approximately 36 inches high, by approximately 48 inches to approximately 90 inches long.

5. The tabletop high above-ground shelter of claim 1, wherein the door is located along a long wall of the housing.

6. The tabletop high above-ground shelter of claim 1, wherein the seated occupants includes: up to approximately five human occupants.

7. The tabletop high above-ground shelter of claim 5, wherein the seated occupants include:
    up to two adult occupants, and
    up to three children occupants.

8. The tabletop high above-ground shelter of claim 1, wherein the foundation includes:
    a rectangular concrete foundation beneath the shelter, wherein the rectangular housing is attachable and detachable from the concrete foundation.

9. The tabletop high above-ground shelter of claim 1, wherein the walls and roof are each formed from: approximately quarter inch carbon steel able to withstand winds of up to approximately 450 miles per hour.

10. The tabletop high above-ground shelter of claim 1, wherein the door further includes:
    hinge means for attaching the door to the shelter and for allowing the door swing out from the shelter;
    hinge guard means for bracing the door to a closed position adjacent to the hinge means so that the door will not swing into the shelter.

11. The tabletop high above-ground shelter of claim 1, further comprising:
    a first bracket on a portion of an inside wall of the shelter for guiding the bar,
    a second bracket on an inside of the door for further guiding the bar; and
    a first slot in the first bracket; and
    a second slot in the second bracket, wherein the first slot and the second slot for allowing the bar to pass therethrough so that the door is in the locked position.

12. The tabletop high above-ground shelter of claim 10, wherein the plural latching means includes: three latching means.

13. A tabletop high above-ground shelter for protecting humans from storms, comprising in combination:

a rectangular housing with a hollow space therebetween, the housing having a height for allowing human occupants be seated therein;

a tabletop for covering for attaching to the rectangular housing and covering over the hollow space;

a side door for accessing the hollow space;

plural horizontal latch means for locking and opening the door, the latch means being accessible to both outside and inside of the shelter to open the door from a closed position, the latch means includes a horizontally oriented elongated bar that having one end that slides inside of the shelter to lock the door, and having portions for allowing the door to be opened and closed;

a vehicle storage structure for storing the housing, the structure chosen from one of: a garage and a carport, the shelter being used in the structure without taking existing space for storing a vehicle away from the vehicle storage structure, wherein the shelter is able to withstand winds of up to approximately 450 miles per hour.

14. The tabletop high above-ground shelter of claims 13, wherein the door further includes:

hinge means for attaching the door to the shelter and for allowing the door swing out from the shelter;

hinge guard means for bracing the door to a closed position adjacent to the hinge means so that the door will not swing into the shelter, and cause injury to occupants.

15. The tabletop high above-ground shelter of claim 13, further comprising:

a first bracket on a portion of an inside wall of the shelter for guiding the bar, a second bracket on an inside of the door for further guiding the bar; and a first slot in the first bracket; and a second slot in the second bracket, wherein the first slot and the second slot for allowing the bar to pass therethrough so that the door is in the locked position.

16. The tabletop high above-ground shelter of claim 13, wherein the plural latching means includes: three latching means.

* * * * *